UNITED STATES PATENT OFFICE.

CHARLES FRANKE, OF NEW YORK, N. Y., ASSIGNOR TO THE FIRM OF HOFFMAN & KIESSIG, OF SAME PLACE.

LAUNDRY-BLUING.

SPECIFICATION forming part of Letters Patent No. 303,144, dated August 5, 1884.

Application filed December 18, 1883. (Specimens.)

*To all whom it may concern:*

Be it known that I, CHARLES FRANKE, of the city, county, and State of New York, have invented certain new and useful Improvements in Laundry-Bluing, of which the following is a specification.

Repeated attempts have been made heretofore to furnish ultramarine in liquid form for laundry use and other purposes, but without success, owing to the fact that the ultramarine, being a pigment, is not soluble in water. It has therefore been used heretofore either in the form of lumps, which are mixed with water prior to use, or mixed with starch and supplied in the form of balls, which are dissolved for use.

The object of this invention is to furnish a concentrated mixture of ultramarine to be used for laundry and other purposes; and it consists of a bluing composed of ultramarine mixed with glucose and water. In preparing the bluing finely-ground ultramarine is first mixed with water. Only so much of water is used that a concentrated mixture is obtained. To this mechanical mixture of ultramarine and water is added about an equal quantity of glucose dissolved in water. The ingredients are thoroughly mixed and form a concentrated mixture of ultramarine, glucose, and water, in which glucose forms the carrier for the fine particles of the pigment and keeps them in suspension, so as to prevent their settling in the bottles. To preserve the same in the summer, a small quantity of salicylic acid or any other equivalent preserving substance may be added, so as to prevent the glucose from fermenting. Ultramarine can thus be furnished in a concentrated liquid form as a bluing for laundry and other purposes, which can be dissolved directly and mixed with the starch for ironing without the delay and loss of time connected with the dissolving of the lumps of ultramarine and ball, bluing heretofore in use.

I am aware that liquid laundry-bluing composed of soluble blue and glycerine has been used heretofore.

I am also aware that soluble bluing mixed with starch, sugar, or other glutinous or saccharine substances has been made up in the form of sticks or fingers heretofore, and I therefore do not claim these mixtures.

Having thus described my invention, I claim as new and desire to secure by Letters Patent—

A bluing for laundry and other purposes, composed of a concentrated mixture of ultramarine, glucose, and water, prepared substantially as and for the purpose set forth.

In testimony that I claim the foregoing as my invention I have signed my name in presence of two subscribing witnesses.

C. FRANKE.

Witnesses:
PAUL GOEPEL,
LOUIS C. RAEGENER.